United States Patent Office 2,849,416

Patented Aug. 26, 1958

1

2,849,416

ADDITION PRODUCTS OF POLYGLYCIDYL ETHERS OF PHENOLIC RESINS AND POLYTHIOLS

Howard L. Bender, Bloomfield, Alford G. Farnham, Caldwell, and John W. Guyer, Verona, N. J., assignors to Union Carbide Corporation, a corporation of New York No Drawing. Application July 12, 1952 Serial No. 298,618

6 Claims. (Cl. 260—43)

This invention relates to plastic compositions prepared by reacting polyepoxide compositions with polythiols. More specifically, it relates to reactive liquid compositions formed by blending polyepoxides having an average number of epoxy groups per molecule of from 1.5 to 3.5 with sulfur-containing mercaptans having terminal thiol groups and having an average number of thiol groups per molecule of from 1.5 to 2.5. Furthermore, the number of epoxy groups blended in the compositions is always equal to, or exceeds, the number of thiol groups.

Such sulfur-bearing thiol chemicals and polymers are generally made from polysulfide resins and rubbers which are first formed by the reaction of organic dihalides with a polysulfide. These polysulfide polymers are then reduced, as by hydrogenolysis, to cleave some of the disulfide linkages to form lower molecular weight liquid polymers or chemicals having terminal thiol groups. For forming one group of such reduced polysulfide resins of low viscosity, dichloroethyl formal is reacted with sodium polysulfide, although other organic halides may be substituted therefor, such as ethylene dichloride, propylene dichloride, dichlorethyl ether, and triethylene glycol dichloride.

Depending on the degree of reduction and on the molecular weight of the starting polysulfide resins, the liquefied polymers may be different average molecular weights varying, as in the case of the polymers from dichloroethyl formal, from about 168 to about 4000 and having corresponding viscosities from 0.5 to 450 poises.

In its more specific embodiments, the invention relates to a liquid composition containing a polyglycidyl ether of a polyhydric phenol and a sulfur-containing polymer having terminal thiol groups of the type described above. This liquid composition will harden by reason of a chemical reaction which occurs between the epoxy rings and the thiol groups. Before it hardens, the liquid composition is sufficiently fluid for use as a sealing, molding or adhesive composition so that the initial liquid will flow through holes larger than about .001" in the smallest cross dimension, but the liquid will not pass the smallest size holes which can be penetrated by air or by water. Since the components of the liquid are capable of reaction with one another, the liquid composition becomes a solid or gel on standing for a few hours at room temperatures. The liquid composition when placed in contact with a porous material will penetrate the larger holes and will seal over the smaller holes. It will then harden to a tough elastic solid having good adhesion to surrounding surfaces, and the solid thus formed acts as a barrier to the flow of liquids and gases. The rate of hardening of the composition can be accelerated by heating or by the use of an alkaline catalyst, such as a tertiary amine.

The hardening of the liquid composition is apparently due to a chemical addition reaction between the epoxy groups of the polyglycidyl ether of the polyphenol and the thiol groups of the sulfur-containing chemical wherein a hydroxyl group appears each time an epoxy ring is consumed. In its simplest form, this reaction may be represented as follows, where R is the divalent stem of a diphenol, and R′ is any divalent organic radical, and preferably a sulfur-containing divalent organic radical:

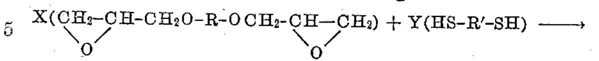

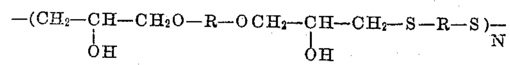

where X represents the number of moles of the diepoxide, Y represents the number of moles of the dithiol and N represents the number of polymeric units combined to produce a solid or a rubber at room temperature, X being equal to or greater than Y.

The reaction is a polymeric one whereby a number of moles of the diepoxide and the dithiol combine to form a much larger molecular compound composed of recurrent units of the respective monomers employed. Interspersed on the final chain, as shown, are hydroxyl groups. Excess of the epoxy rings over thiol groups is preferred. Then crosslinking of the polymer chains by reaction of the epoxide groups of some of the excess epoxy rings with these hydroxyl groups, can and probably does occur, particularly if the ratio of X to Y is appreciably greater than one.

In actual practice, the addition reactions become more complicated as the polyepoxide compositions may be mixtures of monoepoxides, diepoxides, triepoxides and higher epoxides and the polythiols may be mixtures of monothiols, dithiols, trithiols and higher thiols, provided that the average number of epoxy groups per molecule is 1.5 to 3.5 and the average number of thiol groups per molecule is 1.5 to 2.5. For the purpose of stoichiometric calculations one epoxy group is considered to react with one thiol group, and the mixture of polyepoxides may be considered to react as the hypothetical molecule

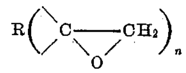

where $n$ is 1.5 to 3.5, and the mixture of polythiols may be considered to react as the hypothetical molecule $R'(—SH)_z$, where $z$ is 1.5 to 2.5. Thus in an equimolar mixture of a monepoxide and a diepoxide, or of a monothiol and a dithiol, $n$ and $z$ are both 1.5. When the number of moles of

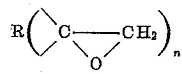

is equal to the number of moles of $R'(—SH)_z$, cross-linking can occur when $n$ is greater than $z$, but does not properly occur when $z$ is greater than $n$. Thus, cross-linking occurs when one mole of a triepoxide is reacted with one mole of a dithiol. On the other hand, cross-linking does not occur when one mole of a dithiol is reacted with a mixture of a half mole of a diepoxide and a half mole of a monoepoxide and such mixtures are excluded from the scope of the invention. To generalize, therefore, when X moles of

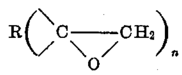

are reacted with Y moles of $R'(—SH)_z$, the product $(Xn)$, must always be equal to, or exceed, the product $(Yz)$, in order to produce the hardened compositions of the invention. By way of illustration, in a mixture of one mole of a monoepoxide, three moles of a diepoxide, and one mole of a triepoxide, X is 5, and $n$ is equal to $$\frac{1\times1+3\times2+1\times3}{5} \text{ or } 2$$

and the product $(Xn)$, is 10. Such a mixture would be suitable for reaction with four moles of a dithiol, in which case the product (Yz), is 8. The monoepoxides and monothiols, when present in the mixture, act as diluents to reduce the viscosity of the liquid composition before reaction and as end-blockers to reduce the chain length of the final hardened products.

The use of mixtures in which the molar ratio of epoxy groups to thiol groups is greater than one contributes several important advantages. In the first place such an excess of epoxy groups insures nearly complete reaction of the thiol groups so that, for instance, the final products do not have an undesirable mercaptan odor. Also, such mixtures are characterized by the fact that they react to form firm thermoset or plastic masses. Furthermore, the reaction will proceed at temperatures as low as —20° C. The properties of the final hardened compositions depend on the degree of condensation or polymerization and this can be controlled by the proper choice of temperature and time relationships. Thus, if the temperature of the reacting mass is kept below —20° C., as by cooling to dissipate the heat of reaction, the product will be fusible and somewhat soft. Upon further heating of this intermediate product above —20° C. for instance to 20° C. to 60° C., it will harden to an infusible rubber or resin. In general, the final products can be toughened somewhat by exposure to temperatures above normal room temperature but exposure to reaction temperatures over 200° C. should be brief to avoid decomposition reactions leading to weak or discolored polymers.

By mixing an excess of a polyglycidyl ether with a polythiol, preferably in the equivalent ratio of 1.01 to 1.50 epoxy groups for each thiol group, a very useful sealing and potting composition is obtained. The fact that no external heat is required to harden the composition is particularly important for field installations where external heating is difficult, as in filling pipe joints or in sealing electrical conduits. This composition, unlike most other sulfur-containing compounds, is non-corrosive to copper, iron and other metals, which permits its use in electrical equipment. This lack of corrosiveness is probably the result of the rapid and almost complete elimination of the mercaptan groups in the polymerization reaction.

For sealing and potting applications, the mixtures of polyglycidyl ethers with polythiols have the important advantage that the volume shrinkage on conversion from the liquid or viscous state to a heat resistant solid is low, being less than 5%. Some types of applications where this low volume shrinkage on hardening is advantageous are: adhesives for joining metal surfaces; adhesives for bonding particles into a shaped mass, such as grinding wheels or molded articles; potting compounds for uniting radio tube assemblies into one structure; pipe sealing as in plugging or in sealing pipe threads and gaskets; liquids to be used to make solid patterns as in type casting; bonding and filling agents for bonding glass fibers or glass cloth; laminating adhesives for bonding paper sheets, cloth or wood veneer into laminated structures and the like.

One of the valuable properties of the polyglycidyl etherpolythiol compositions, while liquid, is their wetting ability and adhesiveness to certain materials and their lack of adhesion to other materials. They adhere well, for instance, to alkyd resins and to styrene-polyester resins, to clean metal surfaces, to dry wood, to glass and to dry stone surfaces. They do not adhere well to water-wet or oily surfaces, nor to wax-like materials, such as beeswax or polyethylene, or to silicone polymers or to plasticized vinyl films. Those materials to which the liquid compositions do not adhere may be used as lubricants or release agents in processing the plastic compositions, as by a molding operation in a lubricated metal mold. One of the valuable properties of the compositions which have first been hardened to a solid form and then contacted with a surface is that then they do not adhere in the hardened state.

Consequently for use as an adhesive the polyglycidyl etherpolythiol compositions should be applied in the unreacted or the partly reacted state. Since, if a contact is made while the composition is liquid, the adhesive quality then will persist after the polymer mass has hardened to the gel or even into the infusible state. In examining such hardened products one often finds a layer of adhesive next to the solid metal or bonded surface which very thin layer of adhesive is definitely less hardened than is the remainder of the adhesive.

For adhesive uses, once contact with the surface to be joined is made while the composition is in the unreacted or partially reacted state, the final thermoset product adheres well to the surface with which it is in contact. The strongest bonds between the plastic and the solid surfaces are obtained in this manner if, in addition, there is one surface of the solidified adhesive not in contact with any solid as exists in a plug of adhesive within the interior of a metal pipe. On heating and cooling such plugs of hardened materials they will expand and contract with heat changes and will move at the free surface, without breaking the bonds between the plastic sealing composition and the metal surface.

In more detail one class of sulfur-containing compounds having terminal thiol groups useful for reaction with polyepoxy compounds comprises the class of polymers having the structure:

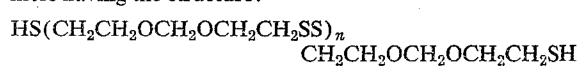

$$HS(CH_2CH_2OCH_2OCH_2CH_2SS)_n CH_2CH_2OCH_2OCH_2CH_2SH$$

where $n$ is 0 or a whole number having a value from 1 to 50. When $n$ is a low number the polymers are liquids, and when $n$ is a high number the polymers are solids which may be melted or dissolved to form liquid compositions. These chemical polymers, many of which are available commercially, have different properties depending on their molecular weight as shown in the following table:

| | | | |
|---|---|---|---|
| Molecular weight | 300 | 1,000 | 4,000 |
| Viscosity, poises | 0.5 | 10 | 450 |
| pH | 5 to 6 | 5 to 6 | 6 to 8 |
| Specific gravity (20/20) | 1.23 | 1.27 | 1.27 |

Since these dithiol compounds will react completely with an equivalent number of epoxy radicals, the properties of the resulting addition polymers will vary depending, among other factors, upon the molecular weight of the starting dithiol polymer. The higher molecular weight thiol polymers react less vigorously and the final converted products are more rubber-like. The lower molecular weight thiol products (av. mol. wt. 300 to 1000) release more heat of reaction per unit weight and being initially less viscous, they are more suitable at room temperature in forming low viscosity sealing compositions. One reason for desiring low viscosity sealing compositions is that air bubbles are released therefrom more rapidly. When the more viscous dithiol polymers are used, the viscosity of the liquid composition consisting of the dithiol polymer and the polyepoxy compound can be reduced by adding a diluent. Such diluents may be of the nonreactive type, such as benzene or the diluents may be plasticizers, such as tricresyl phosphate. If the diluent is a low boiling liquid one, it is often partly removed or entirely removed, but if it is a high boiling liquid it is retained in the final polymeric mass.

On the other hand, where the liquid composition is used as a sealing composition, evaporation of all solvents may be hindered by the mass being hardened. In such instances it is desirable to use, in place of an inert diluent like benzene, a non-viscous mono or diepoxy compound as part of the polyepoxide reactants. Such epoxy products as butyl glycidyl ether, butadiene dioxide, and vinylcyclohexene dioxide, are suitable for this purpose and become part of the final hardened mass. Monomercaptans, such as butyl mercaptan, xylyl mercaptan and benzyl mercaptan can also be used as reactive diluents. The amount of monoepoxides and monomercaptans which can be used, however, is limited by the requirement that in the polyepoxide composition

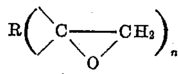

$n$ is 1.5 to 3.5, and in the polythiol composition $R'(—SH)_z$, $z$ is 1.5 to 2.5.

Another aspect of the invention is the type of epoxy groups which are present in the polyepoxides. It has been found that at least half of the epoxy groups must be of the configuration

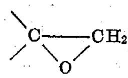

in order for the polyepoxide to react with a polythiol to form a hardened mass. Thus, diepoxides in which all the oxirane oxygen is attached to adjacent carbon atoms, both of which adjacent carbon atoms are attached to other carbon atoms, are unsuited in the practice of the invention. However, not more than half the oxirane oxygen may be so attached, as in vinylcyclohexene dioxide

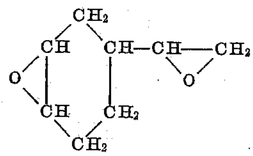

which reacts with polythiols to give a viscous product. However, the preferred compounds are polyepoxides, in which all the epoxy groups are of the configuration

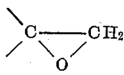

The simplest compound of this class is butadiene dioxide, but other aliphatic diepoxides of the class

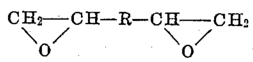

may be used, where R is an alkylene radical, such as methylene, ethylene, propylene, butylene and the like.

The preferred polyepoxides for use in the invention are the polyglycidyl ethers of polyhydric phenols of the formula:

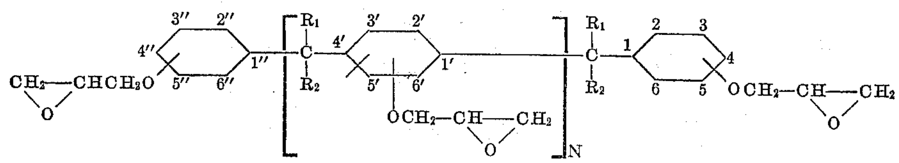

where the connecting methylene or substituted methylene groups in the bracketed radical may be in the 2′, 3′, 4′, 5′ or 6′ positions and the glycidyl ether group in the bracketed radical may be located in any of the four remaining free positions, and N is 0, 1, 2, 3, 4, 5 or 6. When N is 0, the compound is a diglycidyl ether of a diphenol in which the glycidyl ether groups may be in the 2,2″; 2,3″; 2,4″; 2,5″; 2,6″; 3,3″; 3,4″; 3,5″; 3,6″; 4,4″; 4,5″; 4,6″; 5,5″; 5,6″; and 6,6″ positions on the aromatic rings, and in which $R_1$ and $R_3$, separately, may be hydrogen, methyl, ethyl, propyl, isopropyl, butyl, isobutyl, pentyl, isopentyl, hexyl, isohexyl; or cyclohexyl, including the methyl, ethyl, propyl, butyl, pentyl and hexyl substituted cyclohexyls; or phenyl, including the methyl, ethyl, propyl, butyl, pentyl and hexyl substituted phenyls; and in which $R_1$ and $R_2$ taken together with the methylene connector may be a cyclohexyl or a phenyl group, including the methyl, ethyl, propyl, butyl, isobutyl, pentyl, hexyl, substituted cyclohexyls or substituted phenyls; provided that in all such combinations the total number of carbon atoms in $R_1$ and $R_2$ does not exceed twelve. As will be apparent from theoretical considerations, positions 2 and 6 may be considered equivalent with other equivalent positions being 2″ and 6″; 3 and 5; and 3″ and 5″. When $R_1$ and $R_2$, separately, or $R_1$ and $R_2$, collectively, are phenyl, the aromatic rings may contain fluorine and chlorine substituents, as in the fluorophenyls, including the monofluorophenyls, the difluorophenyls, the trifluorophenyls, the chlorophenyls, the dichlorophenyls, the trichlorophenyls, and the fluorochlorophenyls.

These diglycidyl and polyglycidyl ethers of di- and polyhydric phenols can be made in a known manner by the reaction of a dihydric phenol or of a polyhydric phenol with an excess of epichlorhydrin in the presence of caustic soda.

While the compositions containing the polyglycidyl ethers of the polyhydric phenols and the polythiol polymers will react in the absence of a catalyst, the presence of a catalyst is desirable for rapid reactions, particularly when no external source of heat is applied to the compositions. Suitable catalysts are alkaline materials, such as potassium, sodium or lithium hydroxides; alkaline earths metal hydroxides, such as calcium hydroxide; amines of either the aliphatic or aromatic series; such as triethylamine, the propyl, butyl, amyl and n-hexylamines, N-dimethyl ethanolamine, benzyl dimethylamine, dimethyl aniline, tribenzylamine, triphenylamine and the like. Secondary amines and secondary polyamines act both as reactants for epoxide rings and as catalysts for epoxide addition reactions so that the amount of these materials to be used is governed by these facts. The quaternary ammonium bases and the strongly basic ionic resins and solids are also useful catalysts. The amount of catalyst may be as small as 0.1% based on the total composition or may be as high as 5–10% although only slight increments in reaction rates are obtained at the higher catalyst concentration. The preferred catalyst concentration is 0.5 to 5% of the total concentration.

The following examples will illustrate the invention:

EXAMPLE 1

The dithiol compound was bis(beta-mercaptoethoxy)-methane having the formula, $SHC_2H_4OCH_2OC_2H_4SH$, and 16.8 grams of this material were blended at room temperature with 38.7 grams of the diglycidyl ether of diphenylol propane and 0.4 gram of triethylamine.

The mass became hot and reacted exothermally. The reaction mass was held at 90° C., and it became converted to a firm rubbery gel. This gel did not melt on heating to 200° C.

The proportions shown above correspond to a ratio of epoxide groups to thiol groups of 1.0. When these proportions were reduced to a ratio of epoxide groups to thiol groups of 0.5, as by using twice as much of the dithiol than given above, the mixture thickened but remained a liquid, even when heated to 90° C.

EXAMPLE 2

*Part A.—Preparation of a diglycidyl ether*

A fusible phenol-formaldehyde (novolac) resin was produced from the reaction of excess phenol with formaldehyde in the presence of hydrochloric acid as a catalyst. Water was removed from the mass, and the dehydrated fusible resin was distilled under vacuum until its free phenol content was less than 0.5%. The final product met the specifications for a diphenylol methane content of 64–66%, and for a content of compounds having more than 2 rings and up to 8 rings between 34% and 36%. Actually the polyhydric phenol produced was a novolac resin containing about 65% diphenylol methane, about 15% triphenylolmethanes and about 20% polyphenylol methanes, where N is 2 or higher in the formula heretofore stated. The position of the hydroxyl groups in the diphenylol methane was established as about 50% 4,4′; 40% 2,4′ and 10% 2,2′.

This short chain novolac resin was reacted with an excess (about 6 to 1 molar ratio) of epichlorhydrin using caustic soda to remove chlorine in the reaction. There was thus obtained a mixture containing 60% of the diglycidyl ether of diphenylolmethane and 30% of the polyglycidyl ethers of polyphenylolmethanes, the balance being resinified phenylolmethanes. The measured glycidyl ether content of the entire mixture, calculated as the diglycidyl ether of the mixed phenylolmethanes, was 91 to 92%.

*Part B.—Reaction of a diglycidyl ether with a polymeric dithiol*

The diglycidyl ether from Part A (3.8 parts) was mixed with 9.94 parts of a polymeric dithiol having the formula—

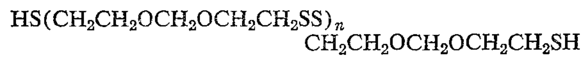

$$HS(CH_2CH_2OCH_2OCH_2CH_2SS)_n CH_2CH_2OCH_2OCH_2CH_2SH$$

an average molecular weight of about 1000, a viscosity in poises of 10, and a specific gravity (20/20) of 1.27 and 0.06 part of benzyldimethyl amine as a catalyst. These proportions correspond to a ratio of epoxy groups to mercapto groups (—SH) of 1.1 to 1.

The mixture was a viscous liquid which slowly reacted exothermically and on standing overnight was converted to a rubbery gel having the properties heretofore described.

EXAMPLE 3

The diglycidyl ether from Example 2, Part A (3.6 parts) was mixed with 9.94 parts of the same polymeric dithiol described in Example 2, Part B, 0.2 part of monobutyl glycidyl ether and 0.06 part of benzyldimethyl amine.

This mixture was lower in viscosity than the mixture of Example 2, Part B, an effect contributed by the monoepoxy diluent. This mixture also reacted exothermically and resulted in a rubbery gel, which was slightly softer than the product of the preceding example.

EXAMPLE 4

The following mixture was prepared:

| | Parts |
|---|---|
| Polyglycidyl ether of Example 2, Part A | 3.8 |
| Dithiol polymer of Example 2, Part B | 9.94 |
| Benzyldimethyl amine | 0.06 |

The time of setting of this mixture, which is the same as Example 2, Part B, was measured more accurately, and it was found that an exothermic reaction took place and a clear, rubbery gel formed within four hours. The gel did not change in character after standing 24 hours. When the catalyst was omitted, the mixture remained liquid for 24 hours, showing the effect of the catalyst in accelerating reaction at room temperature. Non-catalytic mixtures, however, gradually harden on heating or on long standing.

The fact the polyglycidyl ether used was a mixture of a major amount of the diglycidyl ether of diphenylol methane, and a minor amount of the polyglycidyl ethers of polyphenylol methanes having from three to eight phenylol groups provided a favorable combination of properties as to speeds of reaction and cross-linking of the polymeric chains, leading to firmer and tougher gels.

EXAMPLE 5

The following mixture was prepared:

| | Parts |
|---|---|
| Polyglycidyl ether of Example 2, Part A | 76 |
| Dithiol polymer of Example 2, Part B | 198.6 |
| Benzyl dimethyl amine | 1.37 |

The blended mixture was divided into four samples which were stored at different temperatures, and the time required to form a gel was noted. The results were as follows.

| Temperature: | Gel time, hours |
|---|---|
| 30° C. | 1.5 |
| 5° C. | 19 |
| −10° C. | 43 |
| −22° C. | 165 |

The gel formed at −22° C. was soft and rather weak. The gels formed at the other temperatures were firm.

EXAMPLE 6

The following mixture was prepared:

| | Parts |
|---|---|
| Polyglycidyl ether of Example 2, Part A | 94.5 |
| Dithiol polymer of Example 2, Part B | 250 |
| Potassium hydroxide (added as methanol solution) | 0.17 |

This mixture reacted on blending at room temperature and set to a gel in 30 minutes. When the amount of potassium hydroxide catalyst was increased four times, the composition hardened in five minutes. Such rapid hardening mixtures are of value in making emergency repairs to pipe lines and vessels. They can be applied for this purpose by impregnating glass cloth or mat, wrapping this around the break, and in a short time a tight seal around the break is formed.

EXAMPLE 7

The following mixture was prepared:

| | Parts |
|---|---|
| Diglycidyl ether of 4,4′diphenylol propane, 85%[1] | 4.27 |
| Dithiol polymer of Example 2, Part B | 9.94 |
| Benzyldimethyl amine | 0.06 |

[1] Analyzed for glycidyl content and calculated as the diglycidyl ether.

This mixture gelled initially in four hours, and after 24 hours, it was a soft, rubbery gel.

EXAMPLE 8

The diglycidyl ether of diphenylol propane (7.8 parts) was mixed with 0.2 part of triethylamine and 40 parts of a polymeric dithiol of the formula stated in Example 2, Part B, but having an average molecular weight of about 4000. The mixture reacted slowly at room temperature, but on heating to 90° C., the mass became a firm rubbery material after 12 hours.

EXAMPLE 9

The following mixture was prepared:

| | Parts |
|---|---|
| Butadiene dioxide, 90% | 1.1 |
| Dithiol polymer of Example 2, Part B | 9.94 |
| Benzyldimethyl amine | 0.06 |

This mixture started to gel slowly on the surface exposed to air, and in 24 hours the entire mass was a soft gel. In the absence of a catalyst, the mixture hardened more slowly, and in a week it was partially gelled; the bottom of the mass being firmer than the top. The ratio of epoxy groups to mercaptal groups (—SH) in the mixture was 1.1 to 1.0.

EXAMPLE 10

The following composition was prepared:

| | Parts |
|---|---|
| Vinylcyclohexene dioxide | 1.58 |
| Dithiol polymer of Example 2, Part B | 9.94 |
| Benzyldimethyl amine | 0.06 |

The ratio of epoxy groups to mercaptan groups in this composition was 1.1 to 1.0. The composition remained liquid on standing for 24 hours at room temperature, but increased markedly in viscosity on heating for 33 hours at 120° C.

EXAMPLE 11

*Part A.—Preparation of a polyglycidyl ether*

A fusible phenol-formaldehyde (novolac) resin was produced as in Example 2, Part A, except that after removal of the phenol, the diphenylol methanes were removed by vacuum distillation to a final concentration of less than 1%. The remaining residue was a novolac resin containing mostly three-ring and four-ring compounds (triphenylol and tetraphenylol methanes) with a minor amount of higher polyphenylol methanes up to eight rings in length. The average molecular weight was determined as approximately 360, as compared to the theoretical values of 307 for a three-ring novolac resin and 400 for a four-ring novolac resin.

This short chain novolac resin was reacted with an excess (about 8 to 1 molar ratio) of epichlorhydrin using caustic soda to remove chlorine as sodium chloride in the reaction. There was thus obtained a polyglycidyl ether having reactive epoxy groups together with some resinified product. The free epoxide content of this polyglycidyl ether calculated as the glycidyl radical,

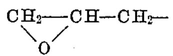

was 32%, whereas the theoretical glycidyl content of the polyglycidyl ether, assuming that the all phenolic hydroxyls of the novolac resin were etherified, was about 36%. As no free phenolic hydroxyl could be detected in the polyglycidyl ether, this indicates that some of the epoxide groups, orginally formed by reaction of the novolac resin with epichlorhydrin, had further reacted or resinified.

*Part B.—Reaction of a polyglycidyl ether with a polymeric dithiol*

The following blend was prepared:

| | Parts |
|---|---|
| Polyglycidyl ether from Part A | 39.2 |
| Dithiol polymer of Example 2, Part B | 99.0 |
| Ammonium base chloline, $HOC_2H_4N(CH_3)_3OH$, as 49% aqueous solution | 1.0 |

The initial mixture containing the strongly basic catalyst, was cloudy, but reacted in an exothermic manner very quickly and became clear. It set to an infusible, rubbery mass within 12 minutes after the initial mixing of the ingredient. The ingredients charged were in a ratio corresponding to 1.1 free epoxy group for each thiol group, and the final product contained no free thiol groups.

EXAMPLE 12

The following mixture was prepared:

| | Parts |
|---|---|
| Polyglycidyl ether of Example 2, Part A | 53.7 |
| Dithiol polymer of Example 2, Part B | 98.3 |
| Benzyl dimethyl amine | 0.7 |
| Ammonium base chloline, $HOC_2H_4N(CH_3)_3OH$, as 49% aqueous solution | 1.0 |

The ingredients charged corresponded to a ratio of 1.5 epoxy groups to 1.0 of thiol groups. The mixture reacted very rapidly, and set to an infusible rubber within six minutes after mixing was started.

EXAMPLE 13

*Part A.—Preparation of a polyglycidyl ether*

Phenol (940 grams—10 moles) was reacted with acrolein (56 grams—1 mole) in the presence of 0.02% by weight of hydrogen chloride as a catalyst at 100° C. for one hour. At the end of this time, the excess phenol was removed under vacuum yielding 277 grams of a novolac resin. The final reaction product was a mixture of two-ring, three-ring, and four-ring novolac resins, with part of the phenol reacted with the double bond of the acrolein and part reacted at the carbonyl group. The average molecular weight of the novolac resin was 322, which is almost the theoretical value for a triphenol considered as the chemical structure

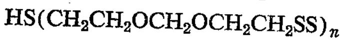

$$CH_3CH(C_6H_4OH)CH(C_6H_4OH)_2$$

This polyphenol mixture was reacted with an excess of epichlorhydrin using caustic soda to remove chlorine. From 322 grams of phenol-acrolein novolac resin there was obtained 489 grams of the polyglycidyl ether, which contained, by analysis, one reactive epoxy group per 189 grams of reaction product, which is 86% of the theoretical epoxide content for a pure triglycidyl ether of the polyphenol, calculated as a triphenol.

*Part B.—Reaction of a polyglycidyl ether with a polymeric dithiol*

The following mixture was prepared:

| | Parts |
|---|---|
| Polyglycidyl ether of Part A | 41.6 |
| Dithiol polymer of Example 2, Part B | 99.4 |
| Benzyldimethyl amine | 0.6 |

This mixture reacted in an exothermic fashion and was converted to a firm rubber within 40 minutes.

What is claimed is:

1. An exothermally reactive composition of matter comprising a dithiol compound of the structure—

$$HS(CH_2CH_2OCH_2OCH_2CH_2SS)_nCH_2CH_2OCH_2OCH_2CH_2SH$$

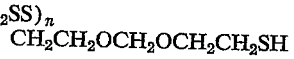

where $n$ is a whole number, and having an average molecular weight of about 1,000; a triglycidyl ether of the triphenylolpropane formed by condensing acrolein and phenol, having a molecular weight of about 322; and an alkaline catalyst; and in which composition the ratio of glycidyl ether groups to thiol groups is at least 1.01 and not greater than 1.50.

2. The thermoset reaction product of the composition defined in claim 1.

3. An exothermally reactive composition of matter comprising a dithiol compound of the structure—

$$HS(CH_2CH_2OCH_2OCH_2CH_2SS)_nCH_2CH_2OCH_2OCH_2CH_2SH$$

where $n$ is a whole number, and having an average molecular weight of about 1,000; a polyglycidyl ether having an epoxide functionality greater than two of the group consisting of (1) polyglycidyl ether mixtures of a fusible phenol-formaldehyde resin, said resin being the reaction product of excess phenol with formaldehyde in the presence of an acid catalyst and containing about 65 percent diphenylol methane and about 35 percent of polyphenylol methanes having from 3 to 8 phenylol groups and (2) a triglycidyl ether of the triphenylolpropane formed by condensing acrolein and phenol, having a molecular weight of about 322, and an alkaline catalyst; and in which composition the ratio of glycidyl ether groups to thiol groups is at least 1.01 and not greater than 1.50.

4. The thermoset reaction product of the composition defined in claim 3.

5. An exothermally reactive composition of matter comprising a dithiol compound of the structure—

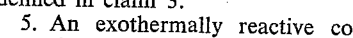

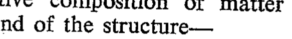

$$HS(CH_2CH_2OCH_2OCH_2CH_2SS)_nCH_2CH_2OCH_2OCH_2CH_2SH$$

where $n$ is a whole number, and having an average molecular weight of about 1,000, and polyglycidyl ether mixtures of a fusible phenol-formaldehyde resin, said resin being the reaction product of excess phenol with formaldehyde in the presence of an acid catalyst and containing about 65 percent diphenylol methane and about 35 percent of polyphenylol methanes having from 3 to 8 phenylol groups; and an alkaline catalyst; and in which composition the ratio of glycidyl ether groups to thiol groups is at least 1.01 and not greater than 1.50.

6. The thermoset reaction product of the composition defined in claim 5.

References Cited in the file of this patent

UNITED STATES PATENTS 666,732 Bakelite ---------------- Nov. 25, 1946
2,510,885 Greenlee ---------------- June 6, 1950
2,528,934 Wiles ------------------- Nov. 7, 1950
2,553,718 Newey et al. ------------- May 22, 1951

OTHER REFERENCES

Chem. & Eng. News, vol. 24, p. 3057.

Columbia Encyclopedia, 2nd ed., Col. Univ. Press (1950), p. 2196 "zero," copy in Sci. Lib.

Jorczak et al.: Ind. & Eng. Chem., vol. 43, February 1951, pp. 324–328.

UNITED STATES PATENT OFFICE

CERTIFICATE OF CORRECTION

August 26, 1958

Patent No. 2,849,416

Howard L. Bender et al.

It is hereby certified that error appears in the printed specification of the above numbered patent requiring correction and that the said Letters Patent should read as corrected below.

Column 5, line 68, for "$R_3$" read -- $R_2$ --.

Signed and sealed this 25th day of November 1958.

(SEAL)
Attest:

KARL H. AXLINE
Attesting Officer

ROBERT C. WATSON
Commissioner of Patents